US010227139B2

(12) United States Patent
Golly et al.

(10) Patent No.: US 10,227,139 B2
(45) Date of Patent: Mar. 12, 2019

(54) HEATED AIR DATA PROBES

(71) Applicant: Rosemount Aerospace Inc., Burnsville, MN (US)

(72) Inventors: Timothy T. Golly, Lakeville, MN (US); Paul R. Johnson, Prior Lake, MN (US); Greg Seidel, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 156 days.

(21) Appl. No.: 15/067,650

(22) Filed: Mar. 11, 2016

(65) Prior Publication Data

US 2016/0280391 A1 Sep. 29, 2016

Related U.S. Application Data

(60) Provisional application No. 62/137,080, filed on Mar. 23, 2015.

(51) Int. Cl.
*G01L 19/00* (2006.01)
*G01L 19/04* (2006.01)
(Continued)

(52) U.S. Cl.
CPC ........... *B64D 43/02* (2013.01); *B65H 54/103* (2013.01); *G01L 19/0092* (2013.01);
(Continued)

(58) Field of Classification Search
None
See application file for complete search history.

(56) References Cited

U.S. PATENT DOCUMENTS

| 2,343,282 A | 3/1944 | Daiber |
| 3,267,992 A | 8/1966 | Werner et al. |

(Continued)

FOREIGN PATENT DOCUMENTS

| EP | 0737315 A1 | 10/1996 | |
| EP | 3073275 A2 * | 9/2016 | ............. B64D 43/02 |

(Continued)

OTHER PUBLICATIONS

Extended European Search Report dated Sep. 5, 2016, issued during the prosecution of European Patent Application No. 16161595.0, 10 pages.

(Continued)

*Primary Examiner* — Andre Allen
(74) *Attorney, Agent, or Firm* — Locke Lord LLP; Scott D. Wofsy; Alicia J. Carroll

(57) ABSTRACT

An air data probe includes a probe head defining a longitudinal axis between a forward tip and aft base. The probe includes a thermocouple having a sense end in the forward tip to measure the temperature in the forward tip. The probe includes a port opening defined in a side of the probe head and opening at an angle with respect to the longitudinal axis. The probe includes a bulkhead within the probe head. The bulkhead has a chamber in fluid communication with the port opening. The chamber includes a single chamber inlet having an elongated cross-sectional shape. The single elongated chamber inlet is in fluid communication with two downstream pressure conduits to provide redundancy in case one of the two pressure conduits is blocked.

3 Claims, 8 Drawing Sheets

(51) Int. Cl.
  *G01P 5/165* (2006.01)
  *B64D 43/02* (2006.01)
  *G01P 13/02* (2006.01)
  *B65H 54/10* (2006.01)

(52) U.S. Cl.
  CPC .............. *G01L 19/04* (2013.01); *G01P 5/165* (2013.01); *G01P 13/025* (2013.01); *B65H 2701/341* (2013.01)

(56) References Cited

U.S. PATENT DOCUMENTS

| | | | |
|---|---|---|---|
| 5,025,661 A * | 6/1991 | McCormack | G01L 19/0007 73/180 |
| 5,046,360 A | 9/1991 | Hedberg | |
| 5,062,869 A | 11/1991 | Hagen | |
| 5,130,707 A | 7/1992 | Hagen | |
| 5,458,008 A | 10/1995 | Rassatt | |
| 5,466,067 A * | 11/1995 | Hagen | G01K 13/02 374/138 |
| 5,653,538 A * | 8/1997 | Phillips | G01K 13/02 374/135 |
| 5,731,507 A | 3/1998 | Hagen et al. | |
| 6,648,939 B2 | 11/2003 | Neuschwander et al. | |
| 6,840,672 B2 | 1/2005 | Ice et al. | |
| 6,892,584 B2 | 5/2005 | Gilkison et al. | |
| 6,941,805 B2 | 9/2005 | Seidel et al. | |
| 7,370,526 B1 * | 5/2008 | Ice | G01K 13/02 374/135 |
| 7,549,331 B1 | 6/2009 | Powell | |
| 7,716,980 B1 | 5/2010 | Colten et al. | |
| 8,060,334 B1 | 11/2011 | Jarvinen | |
| 8,857,255 B2 | 10/2014 | Anderson et al. | |
| 9,541,429 B2 * | 1/2017 | Farokhi | G01P 5/165 |
| 2004/0177683 A1 * | 9/2004 | Ice | G01K 13/02 73/170.02 |
| 2004/0244477 A1 | 12/2004 | Zippold et al. | |
| 2013/0145862 A1 | 6/2013 | Leblond et al. | |
| 2016/0091355 A1 * | 3/2016 | Mesnard | G01F 25/0007 73/197 |

FOREIGN PATENT DOCUMENTS

| | | |
|---|---|---|
| GB | 562880 A | 7/1944 |
| WO | WO-1996/13727 A1 | 5/1996 |
| WO | WO-1998/16837 A1 | 4/1998 |

OTHER PUBLICATIONS

European Office Action dated Aug. 10, 2017 issued during the prosecution of European Patent Application No. 16161595.0 (5 pages).

Partial European Search Report dated Dec. 7, 2018, issued during the prosecution of European Patent Application No. EP 18195270.6 (11 pages).

* cited by examiner

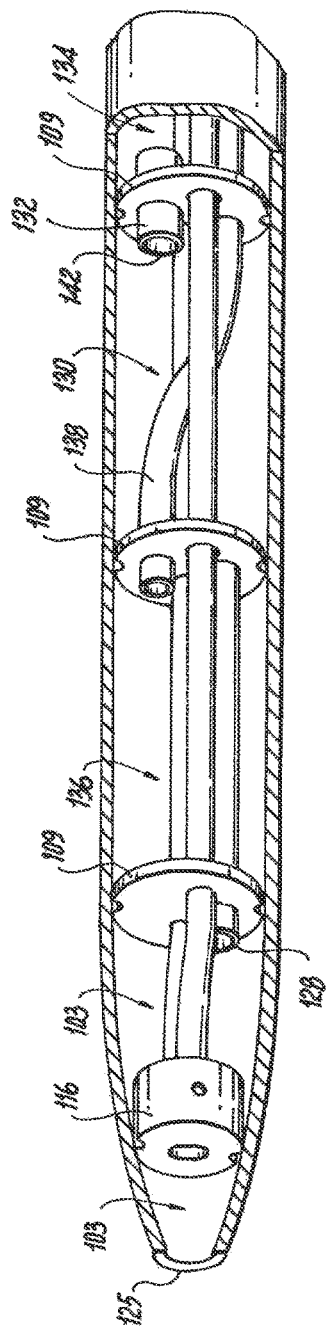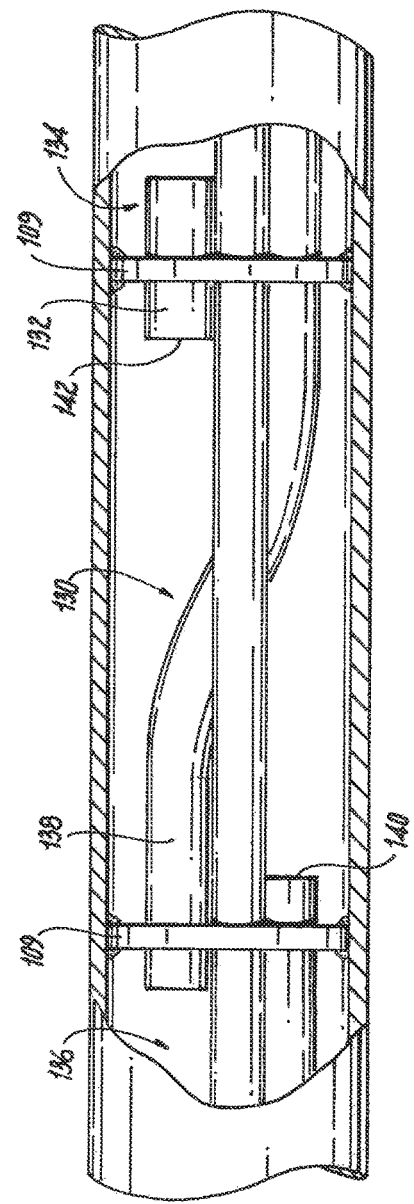

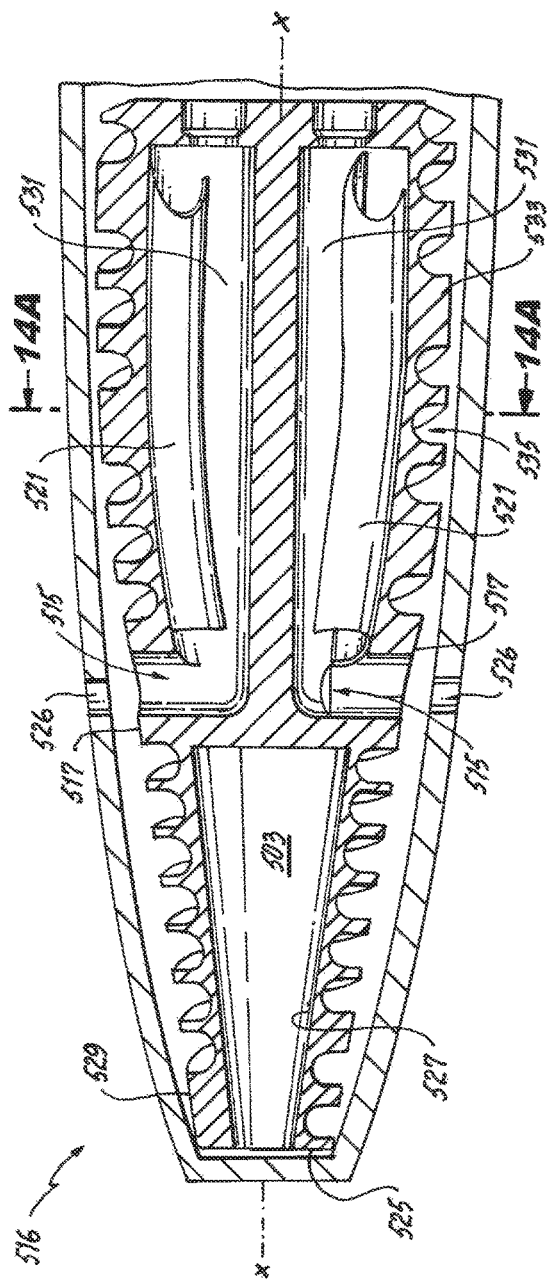
Fig. 13
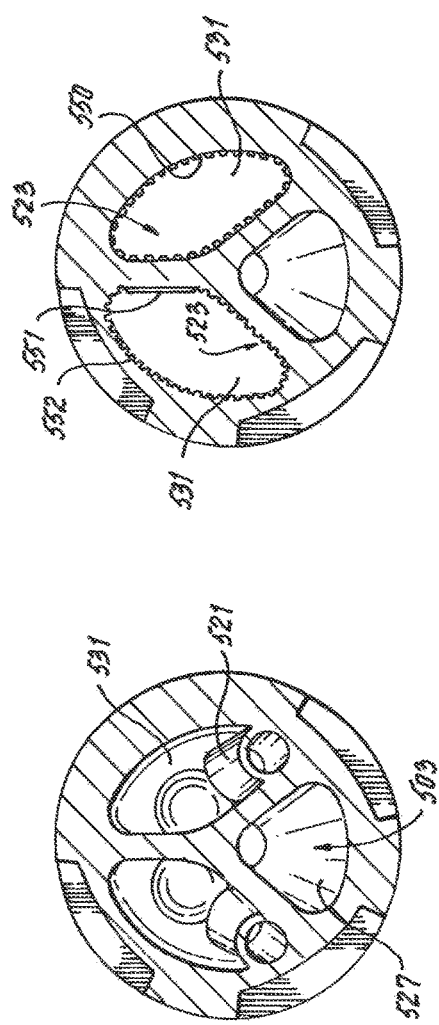
Fig. 14A
Fig. 14B

HEATED AIR DATA PROBES

CROSS-REFERENCE TO RELATED APPLICATIONS

This application claims the benefit of U.S. Provisional Patent Application No. 62/137,080, filed Mar. 23, 2015, which is hereby incorporated by reference in its entirety.

BACKGROUND OF THE INVENTION

1. Field of the Invention

The present invention relates to air data probes, and more particularly to moisture resistant and tolerant air data probes.

2. Description of Related Art

A variety of air data probe devices are known in the art for aircraft flight control. Of such devices, many are directed to measuring pitot pressure, static pressure, local angle of attack pressures, and angle of sideslip pressures as parameters for calculating pressure altitude, altitude rate, airspeed, Mach number, angle of attack, and angle of sideslip. Air data probes can also provide data for secondary purposes including engine control, artificial feel, cabin pressure differential, and more.

During atmospheric moisture conditions, it is possible for air data probes to have pressure sensing measurement errors or spikes due to moisture being present within chambers and conduits of the air data probe. Such moisture includes solid and liquid moisture. During ground operation and in flight, atmospheric moisture can accumulate around and in pressure measuring ports, conduits and chambers, potentially causing menisci to develop which affect the accuracy of the sensed pressures, and therefore affect the accuracy of the determined air speed, altitude, or other measured fluid dynamic characteristic.

Such conventional methods and systems generally have been considered satisfactory for their intended purpose. However, as rain and ice regulations become increasingly strict, and an increasing number of aircraft with fly-by-wire flight controls are being used, tolerance for intermittent pressure spikes, sometimes caused by ingested water, is decreasing. As such, there remains an ever present need to advance the state of the art for reducing errors due to moisture ingestion and for reducing moisture ingestion all together within air data probes. The present invention provides a solution for these needs.

SUMMARY OF THE INVENTION

An air data probe includes a probe head defining a longitudinal axis between a forward tip and aft base. The probe includes a thermocouple having a sense end in the forward tip to measure the temperature in the forward tip.

It is contemplated that the probe can include a bulkhead within the forward tip of the probe head for holding the sense end of the thermocouple. A strut can extend from the aft base of the probe head. The thermocouple can extend from the forward tip of the probe head to a base of the strut and can terminate in a thermocouple connector.

In another embodiment, a method of assembling the heater and thermocouples for an air data probe includes winding a wire heater around a first mandrel to form a wound heater coil.

The method includes removing the first mandrel from the wound heater coil and inserting a second mandrel within the wound heater coil. The second mandrel includes guides for positioning the wound heater coil. The method includes winding a thermocouple around the second mandrel between coils of the wound heater coil to form a wound thermocouple coil, and removing the second mandrel from the wound heater coil and the wound thermocouple coil.

An air data probe includes a probe head defining a longitudinal axis between a forward tip and aft base. A port opening is defined in the forward tip. A first conduit is in fluid communication with the port opening to guide fluid flow from the port opening to a first chamber. The first chamber is downstream from the port opening. A second conduit, offset radially and circumferentially from the first conduit, is in fluid communication with the first chamber to guide fluid flow from the first chamber to a second chamber. The second chamber is downstream from the first chamber. The offset between the first and second conduits is configured to prevent particle ingestion from the port opening from entering the second conduit.

In accordance with some embodiments, a static conduit is in fluid communication with a static chamber. The static chamber can be upstream from the first chamber. The static conduit can direct flow from the static chamber through the first chamber. The static conduit can be sigmoidal shaped between an outlet of the first conduit and an inlet of the second conduit within the first chamber to block a direct pathway between the outlet of the first conduit and the inlet of the second conduit.

In another embodiment, an air data probe includes a probe head defining a longitudinal axis between a forward tip and aft base. The probe includes a port opening defined in a side of the probe head and opening at an angle with respect to the longitudinal axis. The probe includes a bulkhead within the probe head. The bulkhead has a chamber in fluid communication with the port opening. The chamber includes a single chamber inlet having an elongated cross-sectional shape. The single elongated chamber inlet is in fluid communication with two downstream pressure conduits to provide redundancy in case one of the two pressure conduits is blocked.

In yet another embodiment, an air data probe includes a probe head defining a longitudinal axis between a forward tip and aft base. The probe head includes a port opening defined in a side of the probe head and opening at an angle with respect to the longitudinal axis, and a bulkhead within the forward tip of the probe head. The bulkhead includes a chamber inlet in fluid communication with the port opening. The chamber inlet is operatively connected to a downstream pressure conduit having an elongated cross-sectional shape to resist formation of menisci in the downstream pressure conduit.

In accordance with some embodiments, the chamber inlet and the downstream pressure conduit are integrally formed as part of the bulkhead. The probe can include a capillary tube nested within the downstream pressure conduit and abutting an inner surface of the downstream pressure conduit to gather moisture entering the port opening. The capillary tube can be integrally formed with the chamber inlet and the downstream pressure conduit as part of the bulkhead. An inner surface of the downstream pressure conduit can include raised features, and/or recessed features to gather moisture entering the port opening.

An integrally formed bulkhead for an air data probe includes a bulkhead body defining a longitudinal axis. The bulkhead body includes a first chamber inlet and a first chamber. The first chamber is within the bulkhead body and is in fluid communication with the first chamber inlet. Inner walls of the first chamber inlet and the first chamber are substantially smooth and uninterrupted. An outer surface of the bulkhead body includes a heater groove and a thermocouple groove. The bulkhead body separates first and second chambers from the heater and thermocouple grooves.

These and other features of the systems and method of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 5 is a perspective view of the air data probe of FIG. 1 with a portion of the outer probe shell removed, and with the thermocouple and heater coils removed, showing first and second pressure conduits offset circumferentially and radially from one another;

FIG. 6 is an enlarged side view of the pressure conduits and bulkheads of FIG. 5, showing a sigmoidal shaped static pressure conduit;

FIG. 13 is a cross-sectional view of the integrally formed bulkhead of FIG. 12 taken along the longitudinal axis, showing heater and thermocouple grooves;

FIG. 14A is a rear cross-sectional view of the integrally formed bulkhead of FIG. 12 taken perpendicular to the longitudinal axis, showing the capillary tubes and elongated pressure conduits formed integrally with the bulkhead; and FIG. 14B is a rear cross-sectional view of the integrally formed bulkhead of FIG. 12 taken perpendicular to the longitudinal axis, showing the capillary tubes and elongated pressure conduits formed integrally with the bulkhead.

DETAILED DESCRIPTION OF THE PREFERRED EMBODIMENTS

Figure 1:
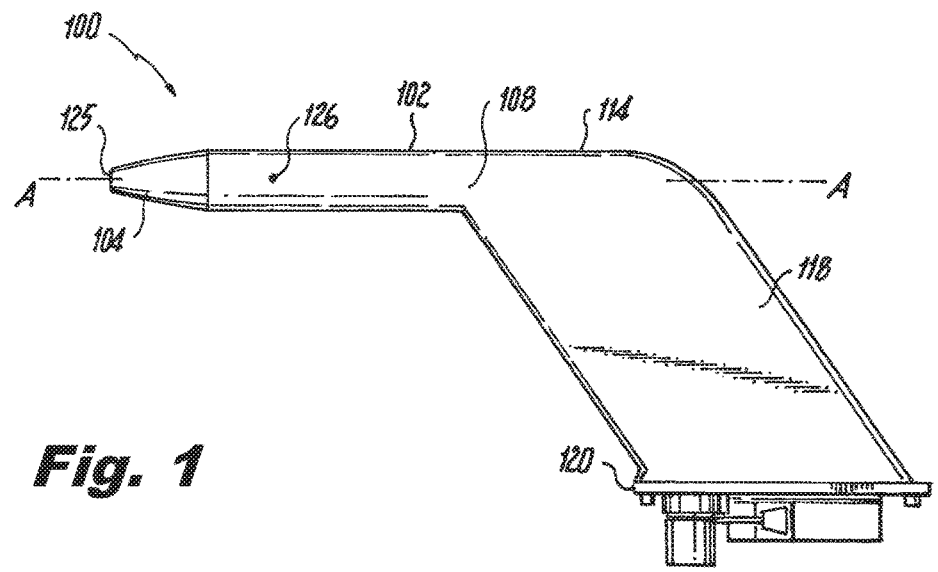
FIG. 1 is a side view of an exemplary embodiment of an air data probe constructed in accordance with the present invention, showing the probe head and strut.
Figure 2:
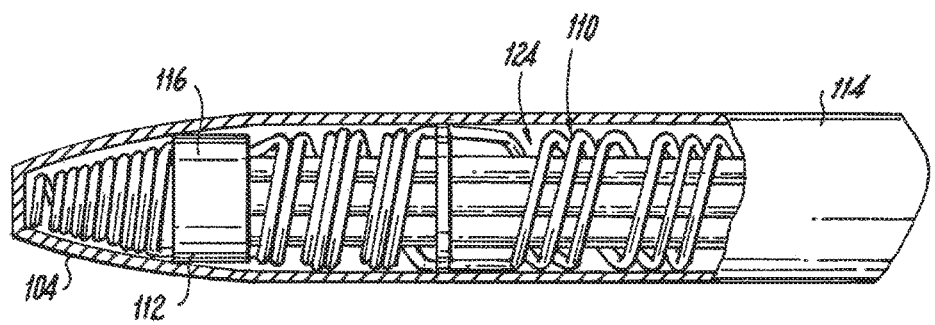
FIG. 2 a side view of the air data probe of FIG. 1 with a portion of the outer probe shell removed, showing the thermocouple and heater coils.
Figure 3:
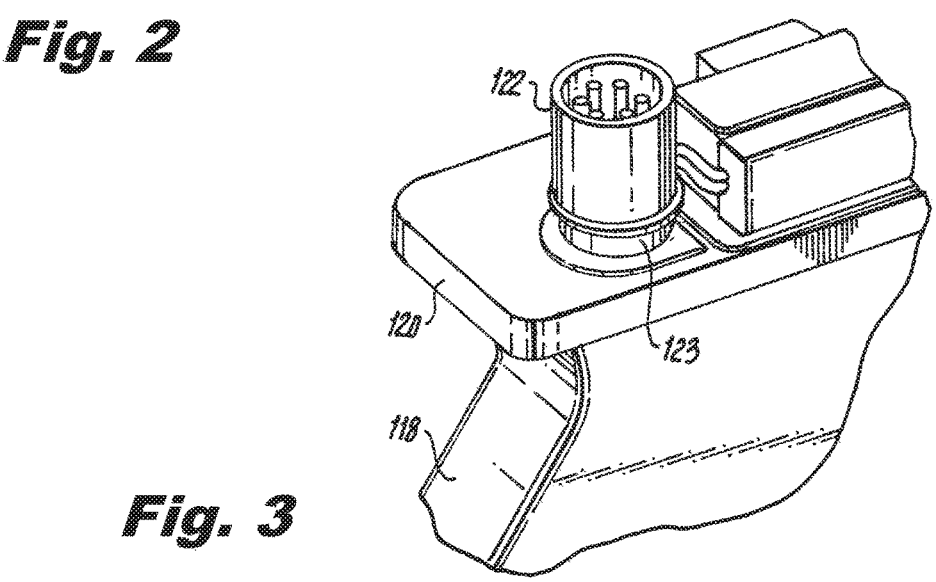
FIG. 3 a perspective view of the air data probe of FIG. 1 as viewed from the underside of the strut, showing the base of the strut with a thermocouple connector.

Reference will now be made to the drawings wherein like reference numerals identify similar structural features or aspects of the subject invention. For purposes of explanation and illustration, and not limitation, a partial view of an exemplary embodiment of an air data probe in accordance with the invention is shown in FIG. 1 and is designated generally by reference character 100. Other embodiments of air data probes in accordance with the invention or aspects thereof, are provided in FIGS. 2-14B as will be described.

As shown in FIG. 1, an air data probe 100 includes a probe head 102 defining a longitudinal axis A between a forward tip 104 and an aft base 108. A strut 118 extends from aft base 108 of the probe head. Probe 100 includes a thermocouple coil 110 having a sense end 112 in forward tip 104 to measure the temperature near forward tip 104 for providing highly accurate and responsive temperature measurements that can be continuously made at forward tip 104 of probe head 102 and without regard to the on/off state of a heater coil 124. A probe shell 114 surrounds thermocouple coil 110. Probe 100 includes a bulkhead 116 within forward tip 104 of probe head 102 for holding sense end 112 of thermocouple coil 110. Thermocouple coil 110 extends from the forward tip 104 of probe head 102 to a base 120 of strut 118 and is interlaced with heater coil 124. Thermocouple coil 110 terminates in a hermetically sealed can 123 below thermocouple connector 122. It is also contemplated that a dedicated tube for thermocouple coil 110 can be used, such that it could be added after the bulk of manufacturing processes had been completed.

Furthermore, those skilled in the art will readily appreciate that thermocouple coil 110 is included in air data probe 100 without taking any cross-sectional area away from internal pressure conduits, e.g. pressure conduits 128, 132, 138 and 331, described below, which should be maximized to prevent meniscus formation due to ingested water. It also does not take away any significant area of the cross-sectional area devoted to the prevention of braze bridge formation during manufacturing.

Air data probe 100 provides improved heater control over traditional heating mechanisms. Traditional heating mechanisms establish probe temperature based on the resistance of the heater element, similar to heater coil 124. Generally, the resistance of the heater element does not correspond well with temperature of the forward tip. It is instead more indicative of the average temperature along the compensating portion of the heater. It also lags behind the tip temperature in transient conditions because the strut has a large thermal mass and low power density. The forward portion of the probe head experiences the highest convection and moisture impingement of any area on the air data probe. Keeping this this area free of ice is an important factor to aerodynamic performance. The forward portion of the probe head must therefore have a very high heater power density even though this area has a low thermal mass. These factors result in very rapid temperature changes along the forward portion of the probe head during transient conditions, especially at the tip. The significant lag and limited accuracy of the temperature measurement in traditional air data probes results in operating temperatures near the probe tip that are frequently far in excess of the desired operating temperature resulting in accelerated corrosion.

By sensing the temperature proximate to forward tip 104 with thermocouple coil 110, air data probe 100 provides more accurate temperature readings, resulting in improved heater coil 124 control and avoiding unnecessary extreme temperature spikes. Improved heater coil 124 control can lead to improved heater life, reduced delamination of certain types of braze materials, and reduced corrosion of the probe head and heater sheath. By reducing corrosion of probe heads 100 aerodynamic performance loss, blockage of drain holes due to internal spalling, heater failures due to sheath perforation, aesthetic issues, and poor de-icing performance can all be reduced. It is contemplated that improved heater coil 124 control can provide a safety benefit for maintenance personnel by reducing maximum probe temperatures.

Furthermore, it is contemplated that thermocouple coil 110 for air data probe 100 can enable more advanced heater control algorithms that could improve heater life, reduce electrical power requirements in many environments, or enable a boost mode in severe conditions. Accurate probe tip temperature together with other air data parameters can permit air data probe 100 to sense when the probe is operating in rain or icing conditions, and/or to determine when probe 100 is on the verge of being overwhelmed by exceptionally severe icing or problems with heater coil 124. Probe temperature measurements for air data probe 100 are not affected by probe heater failure, like traditional resistance based temperature measurements would be. This permits detection of false heater failure indications.

Figure 4:
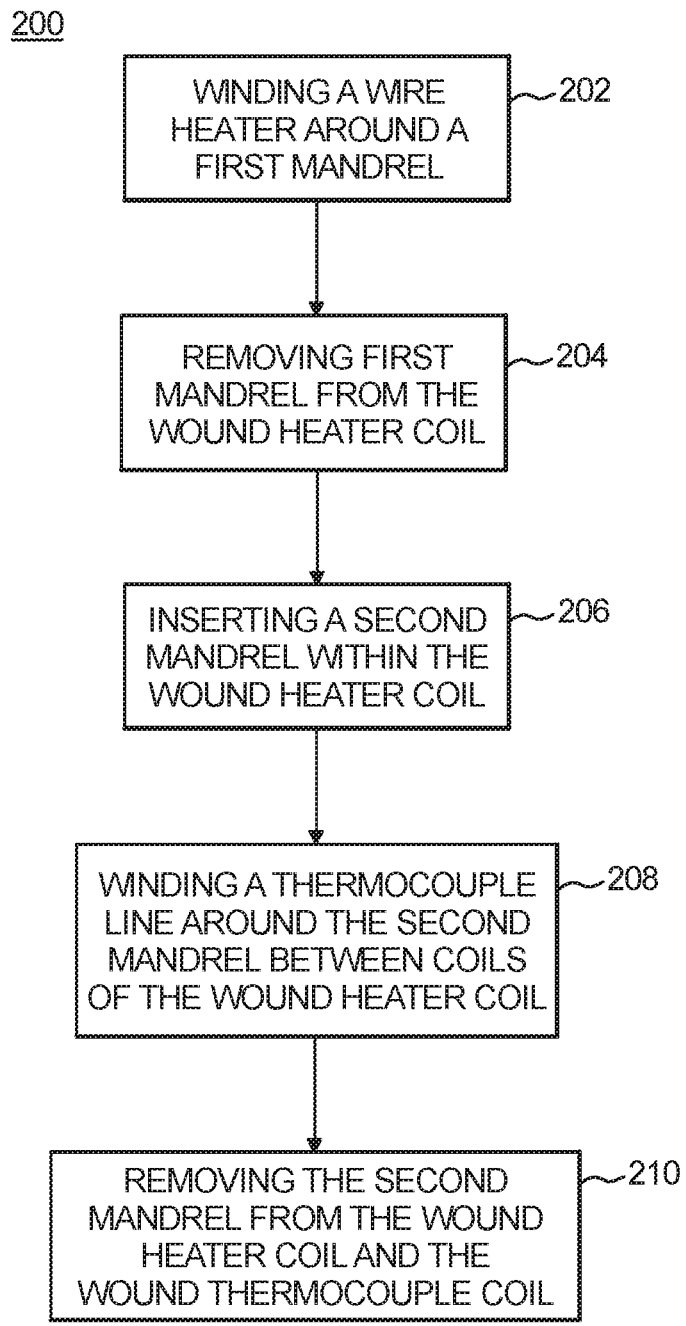
FIG. 4 is a flow chart schematically depicting a method for assembling heater and thermocouple coils in accordance with the present invention.

Now with reference to FIG. 4, a method 200 of assembling heater and thermocouple coils 124 and 110, respectively, for an air data probe 100 includes winding a heater wire around a first mandrel to form a wound heater coil, as indicated by box 202. Method 200 includes removing the first mandrel from the wound heater coil and inserting a second smaller mandrel within the wound heater coil, as indicated by boxes 204 and 206. The second mandrel includes guides for positioning the wound heater coil and holding it in the correct position. Method 200 includes winding a thermocouple around the second mandrel between coils of the wound heater coil to form a wound thermocouple coil, and removing the second mandrel from the wound heater coil and the would thermocouple coil, as indicated by boxes 208 and 210. After the second mandrel is removed, bulkheads and pressure lines can be inserted. The resulting internal assembly is then brazed into the probe shell, e.g. probe shell 114. Those skilled in the art will readily appreciate that using two mandrels allows for the heater and the thermocouple to have different diameters so they both can be at their optimal diameters.

As shown in FIG. 5, air data probe 100 includes a port opening 125, shown in FIG. 1, defined in the forward tip 104. A first conduit 128 is in fluid communication with port opening 125 to guide fluid flow from port opening 125, e.g. pitot port opening 125, and pitot chamber 103, to a first chamber 130, e.g. a drain chamber, defined between two aft bulkheads 109. Drain chamber 130 is downstream from port opening 125. A second conduit 132, offset radially and circumferentially from first conduit 128, is in fluid communication with drain chamber 130 to guide fluid flow from drain chamber 130 to a second chamber 134. Second chamber 134 is downstream from drain chamber 130.

As shown in FIG. 6, a static conduit 138 is in fluid communication with a static chamber 136. Static chamber 136 is upstream from first chamber 130. Static conduit 138 can direct flow from static chamber 136 through first chamber 130. Static conduit 138 is sigmoidal shaped between an outlet 140 of first conduit 140 and an inlet 142 of second conduit 132 within first chamber 130 to block a direct pathway between outlet 140 of the first conduit 140 and inlet 142 of second conduit 132 and replaces it with geometry that causes ice crystals to separate inertially prior to reaching inlet 142 of second conduit 132, e.g. the aft pitot line. The offset between first and second conduits 128 and 132, respectively, and sigmoidal shaped static conduit 138 are configured to prevent particle ingestion from port opening 125 from entering second conduit 132.

The inertia of the particles causes them to scatter to the outer wall of the drain chamber 130 where they can be melted and removed through a drain hole.

When rain conditions are encountered, air data probes can also ingest small amounts of water through the angle of attack (AOA) ports, similar to ports 126, 326, 426, and 526, described below. This ingestion can cause meniscus formation within the traditional AOA ports, chambers, and/or pressure lines because of the narrow geometry of the internal passages. Once a meniscus forms the water can be pulled deeper into the port and corresponding pressure line by the contraction of the air within the AOA pressure line as the probe is cooled by the rain event. This may lead to significant moisture within the pressure line. When the rain event ends the probe temperature increases rapidly and causes the air in the pressure line to expand. The expanding air can then push the meniscus forward and back out through the AOA port. As the water is expelled from the port a series of pressure spikes can occur.

Figure 7A:
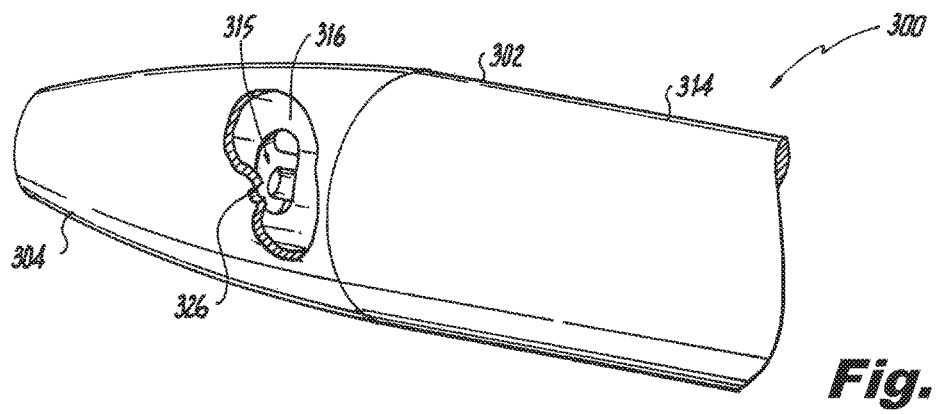
FIG. 7A is a perspective view of another exemplary embodiment of an air data probe constructed in accordance with the present invention, showing the outer probe shell.
Figure 7B:
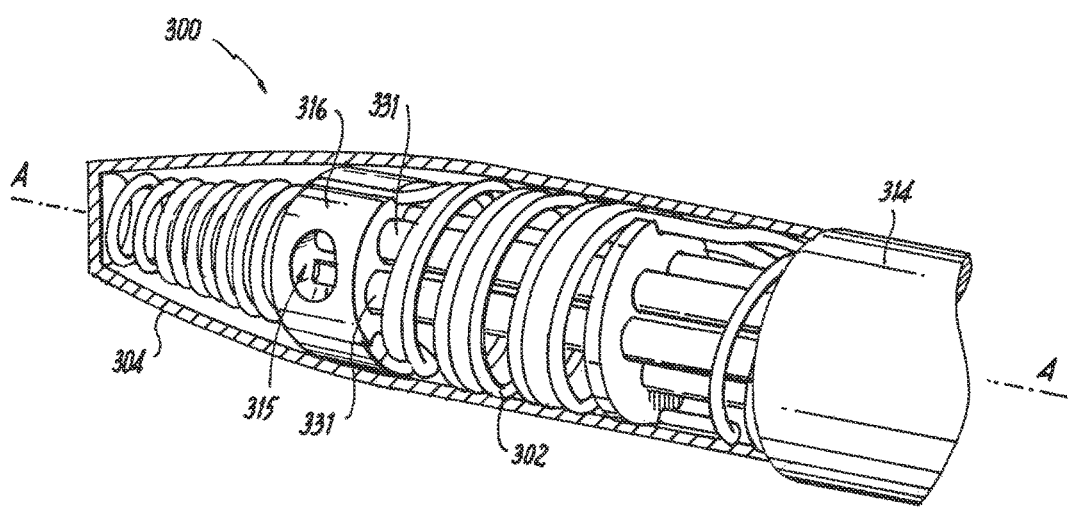
FIG. 7B is a perspective view of a portion of the air data probe of FIG. 7A constructed in accordance with the present invention, with a portion of the outer probe shell removed, showing a bulkhead having redundant pressure conduits.

With reference now to FIGS. 7A and 7B, another embodiment of an air data probe 300, similar to air data probe 100 has a probe head 302 with a forward tip 304 and an aft base (not shown). Probe 300 includes a port opening 326 defined in a side of probe head 302 opening at an angle with respect to longitudinal axis A. Probe 300 includes a bulkhead 316, different from bulkhead 116, within probe head 302. Bulkhead 316 has a chamber 315 in fluid communication with port opening 326.

Figure 8:
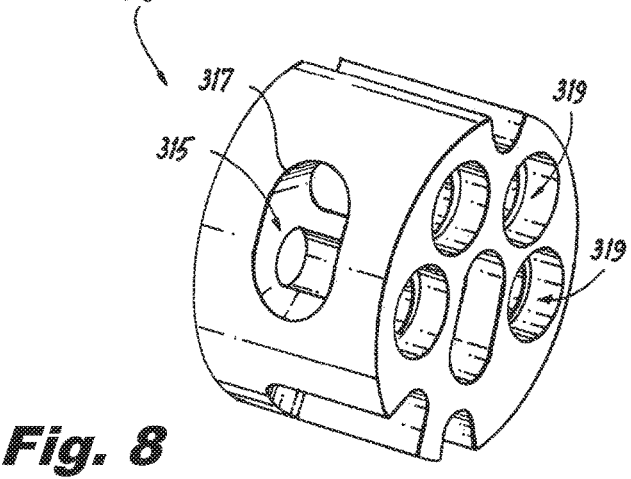
FIG. 8 is an enlarged perspective view of the bulkhead of FIG. 7A, showing a single elongated chamber inlet in pressure communication with two pressure conduits.

As shown in FIG. 8, chamber 315 includes a single chamber inlet 317 having an oval cross-sectional shape. Chamber inlet 317 can have a variety of suitable elongated shapes. The single oval chamber inlet 317 is in fluid communication with two downstream pressure conduits 331, e.g. AOA pressure lines, to provide redundancy in case one of two pressure conduits 331 is blocked. To accommodate connection from chamber 315 to conduits 331, bulkhead 316 includes two outlets 319 for chamber 315. By placing the entrance to one of the pressure conduits 331 closer to port opening 326 and also arranging pressure conduits 331 such that gravity also tends to pull moisture toward pressure conduit 331 that is closer to port opening 326, the other pressure conduit 331, farther from port opening 326, is more likely to remain free of water. Those skilled in the art will readily appreciate that with one pressure conduit 331 open there is no closed system to pull in additional water when probe 300 cools during the rain event or to force slugs of water out of probe 300 when it heats up again after the rain event. The moisture contained in pressure conduit 331 would be gradually removed by a heater instead of all at once thereby eliminating the pressure spikes seen with traditional probes.

Figure 9A:
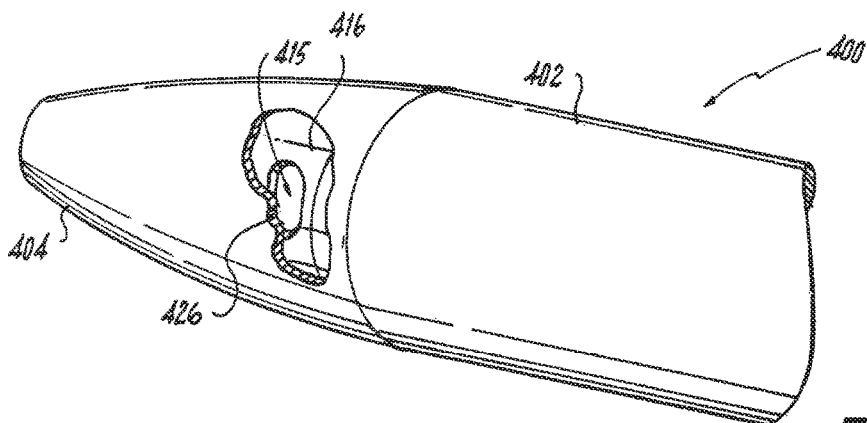
FIG. 9A is a perspective view of another exemplary embodiment of a portion of an air data probe constructed in accordance with the present invention, showing the outer probe shell.
Figure 9B:
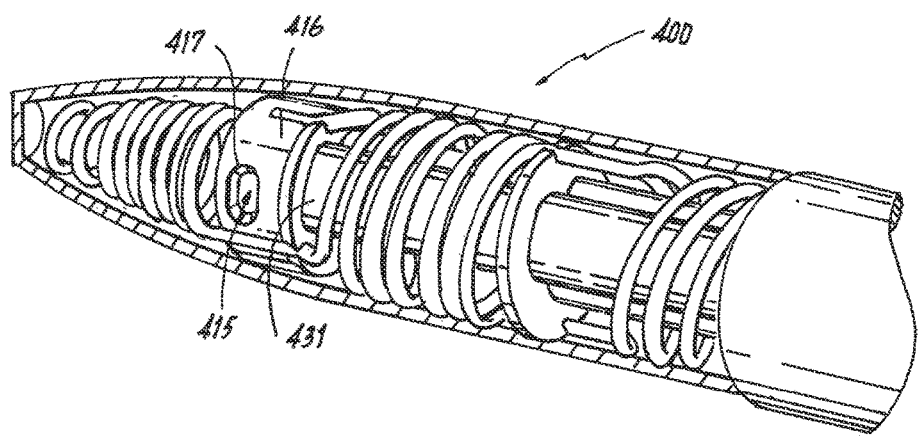
FIG. 9B is a perspective view of a portion of the air data probe of FIG. 9A, with a portion of the outer probe shell removed, showing elongated pressure conduits.

With reference now to FIGS. 9A and 9B, another embodiment of an air data probe 400, similar to air data probe 100 has a probe head 402 with a forward tip 404 and an aft base (not shown). Probe 400 includes a port opening 426 defined in a side of probe head 402 opening at an angle with respect to longitudinal axis A. Probe 400 includes a bulkhead 416, different from bulkhead 116, within forward tip 404 probe head 402. Bulkhead 416 has a chamber 415 in fluid communication with port opening 426 through a chamber inlet 417.

Figure 10:
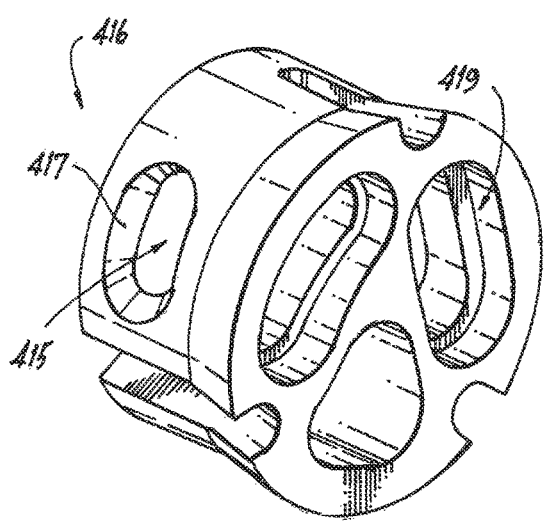
FIG. 10 is an enlarged perspective view of the bulkhead of FIG. 9A, showing elongated chamber outlets, each connected to a respective elongated pressure conduit.

As shown in FIG. 10, chamber 415 includes single chamber inlet 417 having an oval cross-sectional shape. Chamber inlet 417 can have a variety of suitable elongated shapes. Chamber inlet 417 is in fluid communication with a single downstream pressure conduit 431 having an oval cross-sectional shape to resist formation of menisci in downstream pressure conduit 431. Downstream pressure conduit 431 can have a variety of suitable elongated cross-sectional shapes, such as elliptical, D-shaped or wedge shaped. Downstream pressure conduit 431 better uses the existing space within an air data probe than traditional circular pressure conduits are able to, allowing for the usage of larger pressure lines, reducing meniscus formation. The elongation in one direction also reduces meniscus formation. Pressure conduits with a "D" shape or similar also tend to allow water to spread out in the sharp corners by capillary action instead of immediately forming a meniscus. Pressure conduit 431 is optimally sized to be the largest that will fit within the probe head while maintaining necessary clearances. To accommodate connection from chamber 415 to conduit 431, bulkhead 416 includes an elongated oval shaped outlet 419 for chamber 415.

Figure 11:
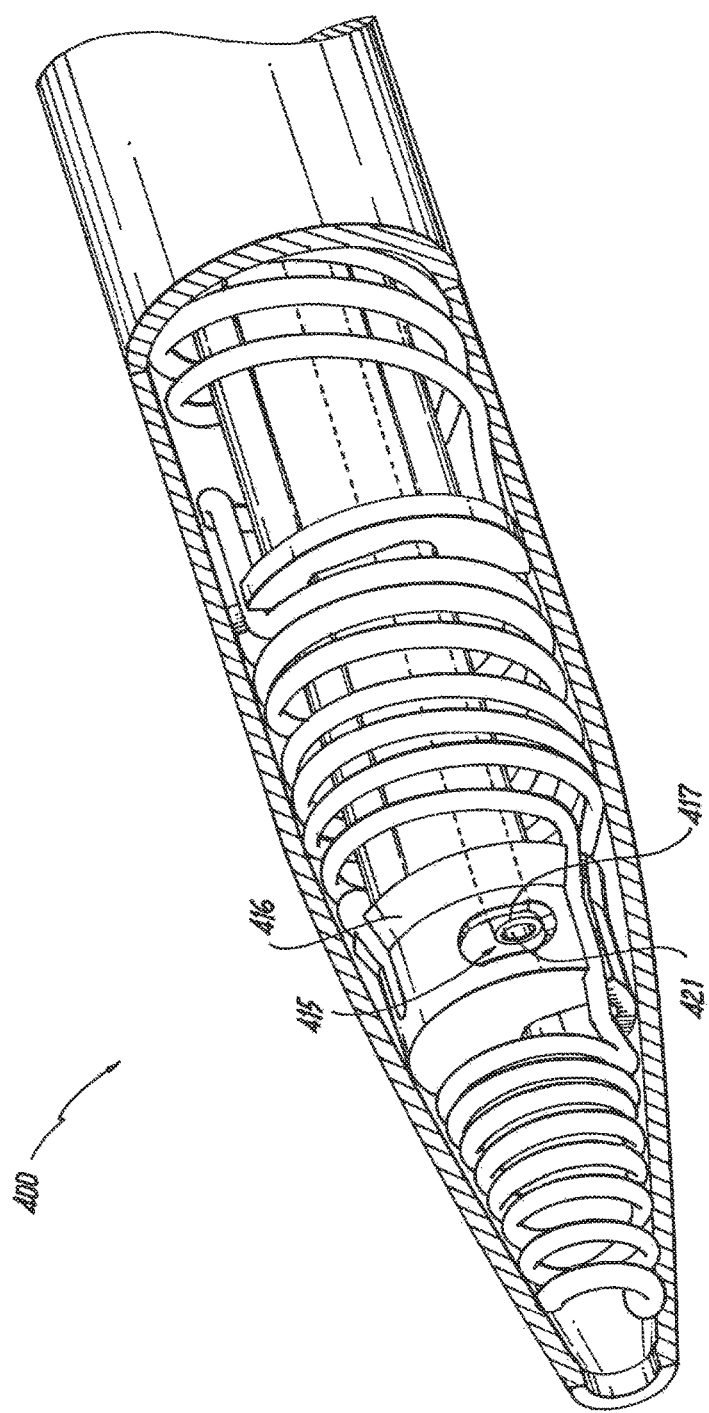
FIG. 11 is a perspective view of a portion of the air data probe of FIG. 9A, showing capillary tubes within the elongated pressure conduits.

With reference now to FIG. 11, probe 400 includes a capillary tube 421 nested within downstream pressure conduit 431 and abutting an inner surface of the downstream pressure conduit to gather moisture entering port opening 426, shown in FIG. 9A. By temporarily trapping water, capillary tube 421 prevents the moisture from forming a meniscus across pressure conduit 431. Capillary tube 421 can be recessed slightly into the opening of larger pressure conduit 431, similar to the recess in FIG. 13, described below.

Figure 12:
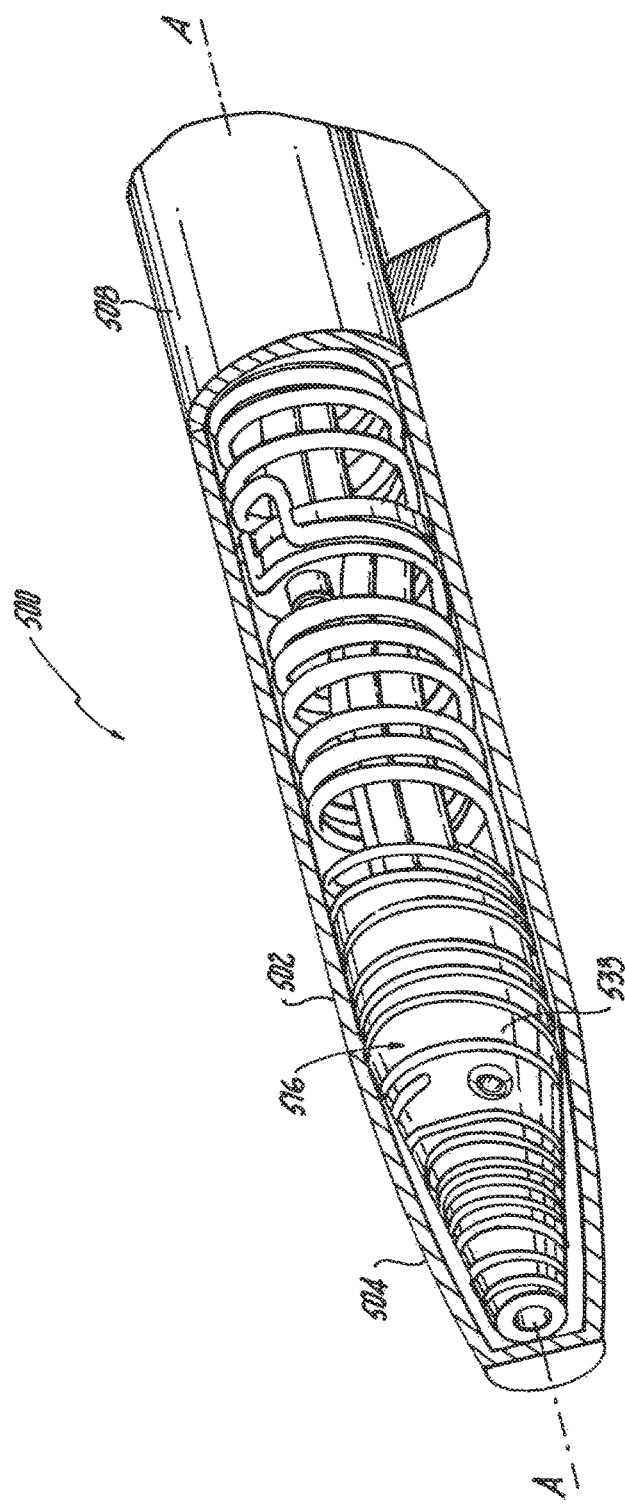
FIG. 12 is a perspective view of a portion of another exemplary embodiment of an air data probe constructed in accordance with the present invention, with a portion of the outer probe shell removed, showing an integrally formed bulkhead.

As shown in FIGS. 12 and 13, another embodiment of an air data probe 500, similar to air data probe 100 has a probe head 502 with a forward tip 504 and an aft base 508. Instead of bulkheads 116, 316 or 416, air data probe 500 includes an integrally formed bulkhead 516. Integrally formed bulkhead 516 includes a bulkhead body 533 defining a bulkhead longitudinal axis X, substantially co-axial with longitudinal axis A of air data probe 500. An outer surface 529 of the bulkhead body includes heater and thermocouple grooves 535.

With continued reference to FIG. 13, integrally formed bulkhead 516 defines three entire chambers, a pitot chamber 503 and two AOA chambers 515, which are typically defined between two separate bulkheads, for example, bulkhead 116 and an aft bulkhead 109 within probe head 302. Each AOA chamber 515 includes a chamber inlet 517 in fluid communication between a port opening 526, similar to port openings 326 and 426, through a chamber inlet 517. A first chamber, e.g. pitot chamber 503, is within the bulkhead body and is in fluid communication with a first chamber inlet 525. Bulkhead body 533 separates chambers, e.g. pitot chamber 503 and AOA chambers 515, from heater and thermocouple grooves 535. Inner walls 527 of first chamber inlet 517 and first chamber 503 are substantially smooth and uninterrupted because of the orientation of the heater and thermocouple grooves 535 on outer surface 529 of bulkhead body 533. It is contemplated that integrally formed bulkhead 516 can be manufactured using additive manufacturing processes, for example, Direct Metal Laser Sintering (DMLS).

It is also contemplated that integrally formed bulkhead 516 allows AOA chambers to be larger than in a typical probe head, thereby permitting AOA chambers 515 to also contain structures designed to temporarily trap and contain small amounts of water. As shown in FIG. 14A, each chamber inlet 517 and downstream pressure conduit 531 are integrally formed as part of the bulkhead. Capillary tubes 521, similar to capillary tubes 421, are also integrally formed within respective conduits 531. Capillary tube 521 is recessed slightly into the opening of larger pressure conduit 531, providing increased moisture trapping.

With reference to FIG. 14B, in addition to or instead of capillary tubes 521, an inner surface 523 of downstream pressure conduit 531 can include raised features 550, e.g. finned walls, and/or recessed features 552 to gather moisture entering the port opening. Those skilled in the art will readily appreciate that raised features 550 and recessed features 523 can be achieved through additive manufacturing processes. It is also contemplated that there can be a porous material layer 551 on inner surface 523, or on an inner surface of chambers 515. Once the moisture is captured it can gradually be vaporized after the rain event by the heater coil. A brief period of on-ground heater operation during taxi would also be sufficient to clear any moisture.

The embodiments disclosed herein can be used independently, or in conjunction with one another. Air data probes 100, 300, 400 and 500 result in reduced ingestion and/or increased moisture tolerance over existing air data probes.

The methods and systems of the present invention, as described above and shown in the drawings, provide for air data probes with superior properties including reducing and resisting moisture and the formation of menisci, and reducing pressure sensor errors associated therewith. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. An air data probe comprising:
    a probe head defining a longitudinal axis between a forward tip and aft base;
    a heater coil positioned within the probe head; and
    a thermocouple having a sense end in the forward tip to measure the temperature in the forward tip, wherein the thermocouple includes a thermocouple coil, wherein windings of the thermocouple coil are wound between windings of the heater coil.

2. An air data probe as recited in claim 1, further comprising a bulkhead within the forward tip of the probe head for holding the sense end of the thermocouple.

3. An air data probe as recited in claim 1, further comprising a strut extending from the aft base of the probe head, wherein the thermocouple extends from the forward tip of the probe head to a base of the strut and terminates in a thermocouple connector.

* * * * *